(12) United States Patent
Medi et al.

(10) Patent No.: US 7,566,994 B2
(45) Date of Patent: Jul. 28, 2009

(54) SMALL-STEP, SWITCHABLE CAPACITOR

(75) Inventors: Ali Medi, Santa Monica, CA (US); Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 261 days.

(21) Appl. No.: 11/343,845

(22) Filed: Jan. 31, 2006

(65) Prior Publication Data

US 2007/0176494 A1  Aug. 2, 2007

(51) Int. Cl.
- H02M 3/06 (2006.01)
- H01G 7/00 (2006.01)
- H01G 4/38 (2006.01)

(52) U.S. Cl. .................. 307/109; 307/98; 307/115; 334/55; 334/83; 361/277; 361/278; 361/292; 361/328

(58) Field of Classification Search .................. 307/98, 307/109, 115; 334/55, 83; 361/277, 278, 361/292, 328

See application file for complete search history.

(56) References Cited

U.S. PATENT DOCUMENTS

| | | | | |
|---|---|---|---|---|
| 4,531,113 A | * | 7/1985 | Abraham | .................. 341/136 |
| 4,668,936 A | * | 5/1987 | Newcomb et al. | ............ 341/172 |
| 4,999,633 A | * | 3/1991 | Draxelmayr | ................ 341/120 |
| 6,181,218 B1 | * | 1/2001 | Clark et al. | .................... 334/55 |
| 6,239,675 B1 | | 5/2001 | Flaxl | |
| 6,707,403 B1 | * | 3/2004 | Hurrell | ........................ 341/120 |

* cited by examiner

*Primary Examiner*—Albert W Paladini
*Assistant Examiner*—Hal I Kaplan
(74) *Attorney, Agent, or Firm*—Brake Hughes Bellermann LLP

(57) ABSTRACT

According to an example embodiment, an apparatus is provided that produces a small-step switchable capacitor, which can have steps that are smaller in value than the smallest capacitor used in the system. In one embodiment, an input signal is connected to a switchable capacitor system that includes at least one and/or a plurality of small-step, switchable capacitors. In an example embodiment, a capacitor system may be provided that includes a first capacitance block coupled in series with a second capacitance block. In an example embodiment, the second capacitance block may include one or more switchable capacitors to provide a step in capacitance for the capacitor system between a first setting and a second setting using the one or more switchable capacitors. Also, in an example embodiment, the step in capacitance of the capacitor system may be determined based, at least in part, on a ratio of the capacitance of the second capacitance block to the capacitance of the first capacitance block.

16 Claims, 9 Drawing Sheets

Switch Open: C-Effective = [ (C1 * C2) / (C1 + C2) ]

Switch Closed: C-Effective = [ C1 * (C2 + C3) ] / (C1 + C2 + C3)

(ΔC) = [ C1 * (C2 + C3) / (C1 + C2 + C3) ] - [ (C1 * C2) / (C1 + C2) ]

SMALL-STEP, SWITCHABLE CAPACITOR

BACKGROUND

Switchable capacitors are used in a variety of architectures that require transitions between states of effective capacitance. Switchable capacitors are used, for instance, to modify the tuning frequency, change the bandwidth, and perform tweak matching. Typical switchable capacitors comprise a capacitor followed by a switch. The smallest step size in these types of architectures depends on the size of the smallest capacitor that can be used.

For instance, if a 20 fempto-farad (ff) (or $10^{-12}$ Farad) capacitor is the smallest capacitor that is used, then the smallest step size is 20 fF, because the capacitors are connected together and controlled individually by the opening and the closing of switches. Therefore, some, all, or none of the capacitors can be turned on or off at any given moment and the total capacitance of the system is measured by adding together the capacitance values for all of the capacitors that are turned on.

In applications that use binary control signals to control switchable capacitors, the current technique is for bits to control the switches on the capacitors. For instance, in a system having a branch with eight capacitors, 3 bits can be used to control the 8 possible capacitor configurations. Turning the eight capacitors off in this branch is caused by the signal 000. Likewise, turning two of the capacitor off results from a 101 binary signal. An arbitrary number of capacitors can be connected in this manner to be controlled by an arbitrarily large binary signal as needed. The step size, however, cannot be made smaller than the smallest capacitor in the branch.

It is desirable in many applications to provide a small capacitance step size in a switchable capacitor system. It may be impossible to continually reduce the step merely by trying to build a smaller capacitor, because the smallest capacitor size achievable is limited by the parasitics around the capacitor. This physical limitation will make it difficult to significantly reduce the step size using conventional techniques.

SUMMARY

According to an example embodiment, a small-step, switchable capacitor is provided, which can have steps that are smaller in value than the smallest capacitor used in the system. In one embodiment, an input signal is connected to a switchable capacitor system, including at least one and/or a plurality of small-step, switchable capacitors. The switchable capacitor system is connected to an input signal.

In another embodiment, the switchable capacitor system includes a coarse variable capacitance block and a fine variable capacitance block. The coarse variable capacitance block receives a set of control signals, optionally in the form of control bits, which activate one or more types of capacitors using one or more switches in order to provide a modified impedance to the input. The fine variable capacitance block also receives control signals and causes more accurate change in impedance.

According to one embodiment, a fine variable capacitance block, which can stand alone or be used in conjunction with a coarse variable capacitance block, comprises a first capacitance block (or area) and a second capacitance block (or area) connected in series. The first capacitance block comprises a capacitor and the second capacitance block comprises at least a second capacitor and one or more additional capacitors controllable by switches. By opening and closing the switches in the second capacitance block, different effective capacitance values are provided to the system when it transitions between a first state (switch open) and a second state (switch closed).

More specifically, a non-linear relationship may be created between each step in at least a portion of the fine variable capacitance block, as additional capacitors are added in parallel within the second capacitance area. In this embodiment, each step comprises closing the switch on all of the closed capacitors in the previous step plus closing one or more additional capacitors (depending on the size of the step needed). As the ratio between the capacitance of the second capacitance area and the capacitance of the first capacitance area increases, the step size decreases, or approaches zero. In other words, as the ratio of the capacitance values of the second capacitance area to the first capacitance area increases, the step size of the effective capacitance decreases.

In an example embodiment, as the second capacitor block has additional capacitors added in parallel in the branch, it becomes possible to create an arbitrarily small step in the switchable capacitor branch. According to one embodiment, one or more custom small-steps can be provided to a block wherein the custom small-steps are able to transition between a first capacitance value and a second capacitance value, where the difference between the first and second capacitance values can be made arbitrarily small and is not limited by the size of the smallest capacitor used in the system. Once a block is established for a custom small-step, the block can be copied and repeated an arbitrary number of times on a board or other application. A variable capacitor can be provided which, includes one or more custom small steps of various sizes, as well as larger traditional steps, to provide steps through a wide range of capacitance.

In another embodiment, a capacitor system is provided that includes a first capacitance block including one or more capacitors, and a second capacitance block including one or more capacitors. The second capacitance block is coupled in series with the first capacitance block. In an example embodiment, at least one of the first capacitance block and the second capacitance block may include one or more switchable capacitors to provide a step in capacitance for the capacitor system between a first setting and a second setting using the one or more switchable capacitors. The step between the first setting and the second setting of the capacitor system is capable of being smaller than all of the one or more capacitors used in the first capacitance block and the second capacitance block.

In another embodiment, a capacitor system may be provided that includes a first capacitance block including one or more capacitors, and a second capacitance block coupled in series with the first capacitance block. The second capacitance block may include one or more switchable capacitors. In an example embodiment, the second capacitance block may include one or more switchable capacitors to provide a step in capacitance for the capacitor system between a first setting and a second setting using the one or more switchable capacitors. Also, in an example embodiment, the step in capacitance of the capacitor system may be determined based, at least in part, on a ratio of the capacitance of the second capacitance block to the capacitance of the first capacitance block.

In another embodiment of the capacitor system, the second capacitance block may include one or more switchable capacitors. The step in capacitance between the first setting and the second setting of the capacitor system is capable of being smaller than each of the one or more capacitors used in the first capacitance block and the second capacitance block.

In yet another embodiment, a method of tuning a switchable capacitor system to provide a desired step size is provided. A desired capacitance step size is determined for the capacitor system. The capacitor system including a plurality of capacitors. The capacitor system is configured to provide the determined capacitance step size. The capacitance step size is smaller than each of the plurality of capacitors in the capacitor system.

DETAILED DESCRIPTION

Figure 1A:
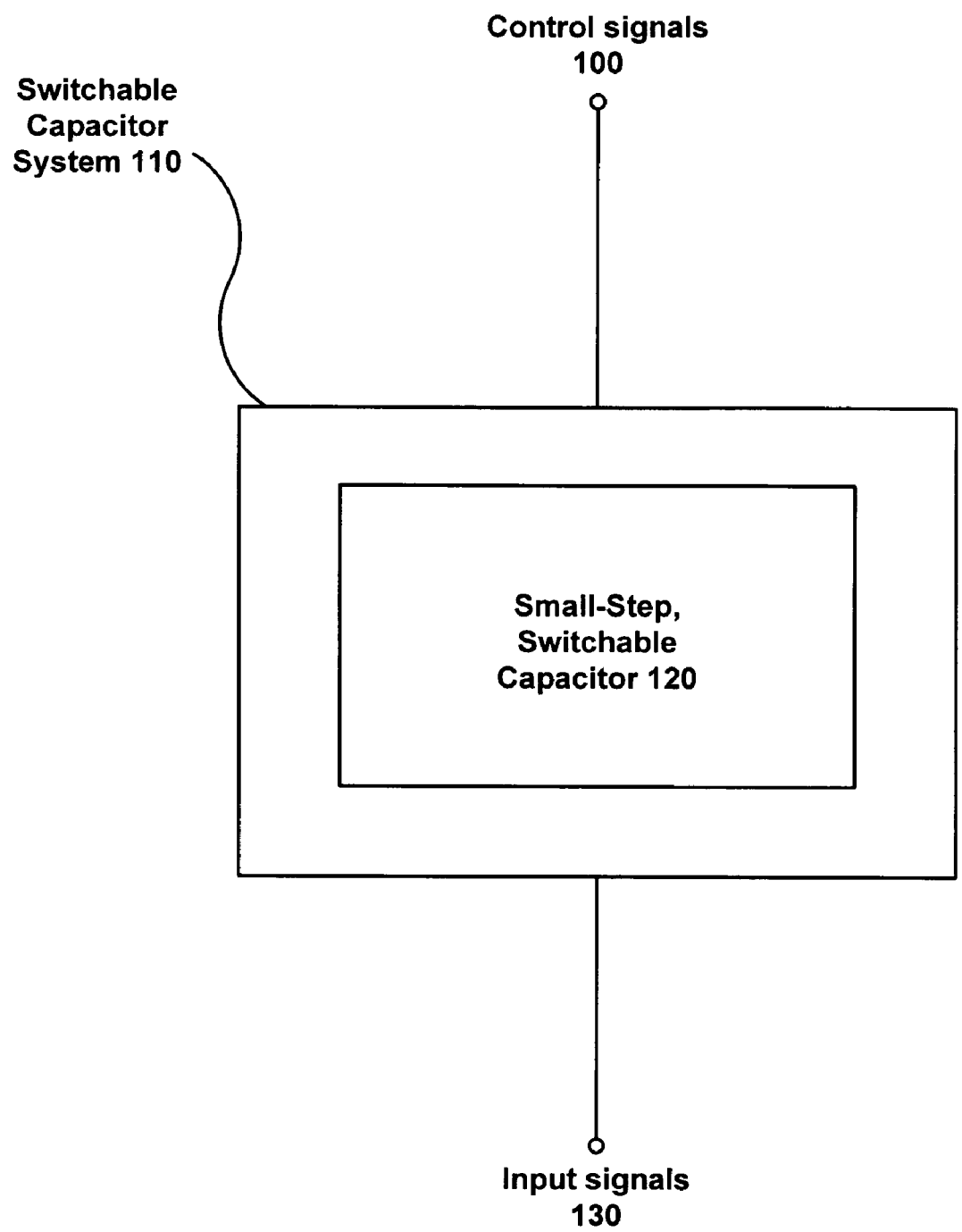
FIG. 1A is a block diagram of a switchable capacitor according to an example embodiment.

FIG. 1A is a block diagram of an example embodiment. The example embodiment includes one or more small-step, switchable capacitors. The one or more small-step, switchable capacitors provide steps, which may be smaller in value than the smallest capacitor used in the system. A set of control signals 100 is connected to a switchable capacitor system 110 that includes at least one small-step, switchable capacitor 120, which can comprise some or all of the switchable capacitor system 110. The control signals 100 may be, for instance, control bits that activate and deactivate various capacitors in the switchable capacitor system 110. The switchable capacitor system 110 is connected to an input signal 130.

Figure 1B:
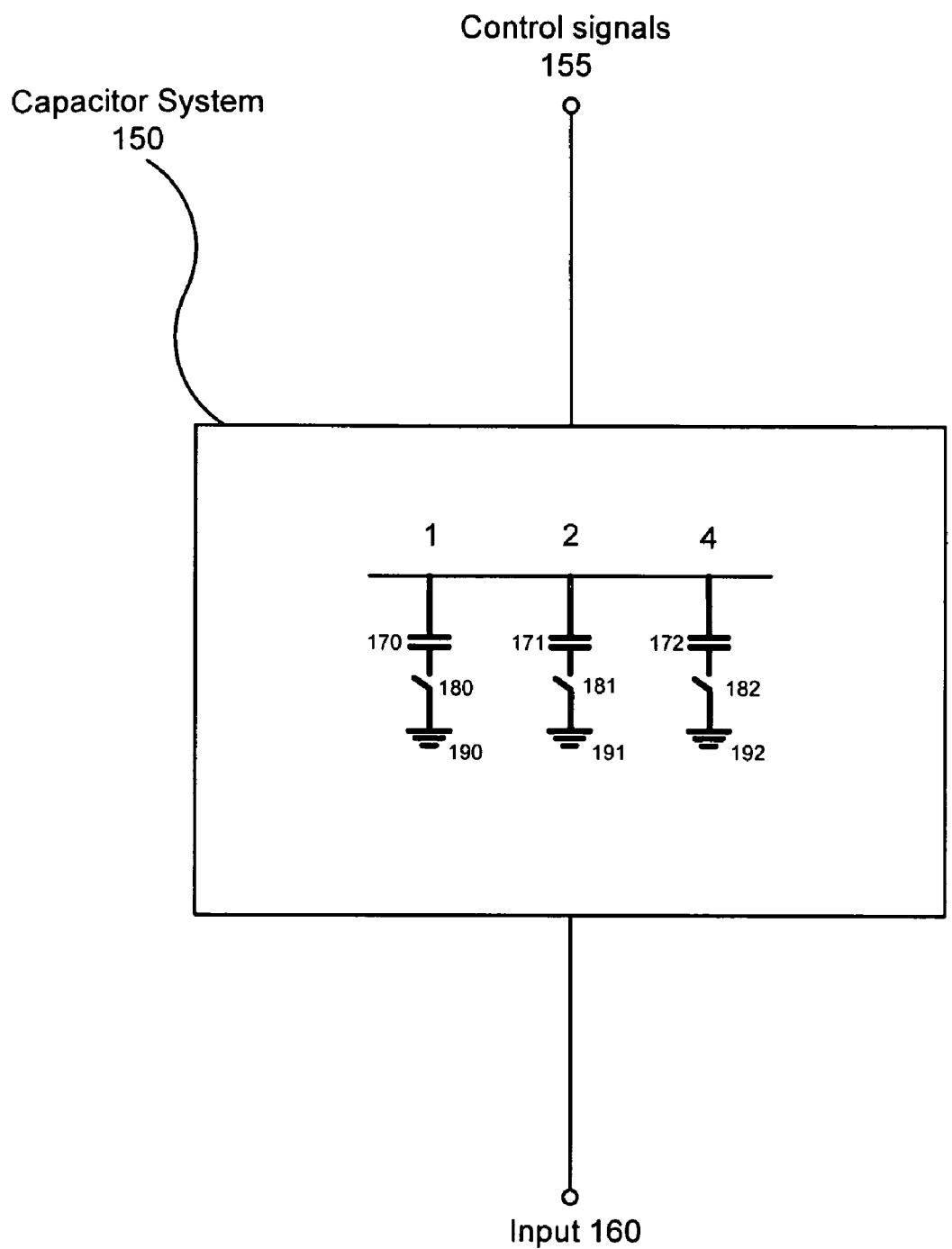
FIG. 1B is a block diagram of a current switchable capacitor system.

FIG. 1B is a block diagram of a switchable capacitor system. A capacitor system 150 is connected between an input 160 and ground. The capacitor system includes first, second, and third capacitors 170, 171, and 172. The system 150 also includes switches 180, 181, and 182 between the capacitors 170-172 and grounds 190, 191, and 192, respectively. FIG. 1B is a binary weighted capacitor. Binary numbers can be used as control bits to selectively open and close the switches 180-182 to thereby couple capacitors 170-172, respectively, to ground. A set of control signals 155 is being used to change the capacitance value (180-182 are a part of 150).

In operation, binary control bits may control the closing of the switches. For example, a binary number 3 (011) may be used to close switches 180 and 181, thereby coupling capacitors 170 and 171, respectively, to ground. Similarly, the binary number 4 (100) may be used to close only switch 182, thereby coupling only capacitor 172 to ground. Each additional capacitor may provide twice the capacitance of the previous capacitor (binary weighted capacitor).

In FIG. 1B, the size of the step when the system transitions between binary states is linear and fixed by the size of the smallest capacitor that is available to be used in the system, in this case 20 fF. The transitions are defined with regard to Table 1:

TABLE 1

| Number (Base 10) | Number (Base 2) Binary | Step Size |
|---|---|---|
| 0 | 000 | 20 fF |
| 1 | 001 | 20 fF |
| 2 | 010 | 20 fF |
| 3 | 011 | 20 fF |
| 4 | 100 | 20 fF |
| 5 | 101 | 20 fF |
| 6 | 110 | 20 fF |
| 7 | 111 | 20 fF |

Thus, since 20 fF capacitors are being used, then when the control bits transition from 001 to 010, there is a step (or increase in effective capacitance) of 20 fF. When the system transitions from 101 to 110, there is also a step of 20 fF. Every step is 20 fF.

However, in the diagram of the example embodiment of FIG. 1A, the size of the steps provided by the small-step, switchable capacitor is completely adjustable to be any arbitrary transition between levels of effective capacitance, regardless of the size of the capacitors being used in the architecture.

Figure 2:
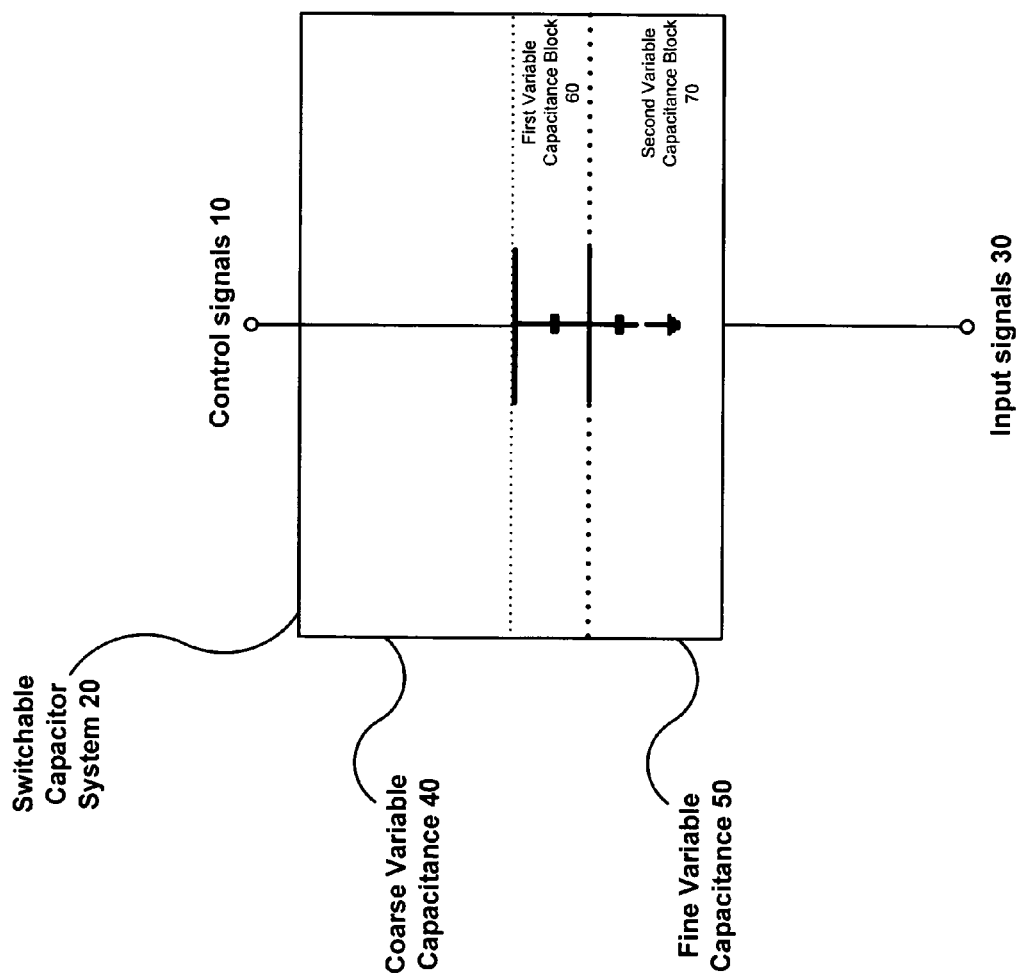
FIG. 2 is a block diagram of a small-step, switchable capacitor according to an example embodiment.

FIG. 2 is a block diagram of a switchable capacitor system according to an example embodiment, which uses one or more small-step, switchable capacitors and can have steps that are smaller in value than the smallest capacitor used in the system. FIG. 2 includes a control signal 10, connected to a switchable capacitor system 20, connected to a input signal 30. The switchable capacitor system includes a coarse variable capacitance block 40 and a fine variable capacitance block 50.

The coarse variable capacitance block 40 is provided with an input signal, which may optionally be in the form of control bits. The control bits control one or more types of capacitors using one or more switches, in order to provide a modified impedance to the input signal 30. The fine variable capacitance block 50 receives separate control bits and causes the further impedance modification. Each step is a transition from a first effective capacitance value to a second effective capacitance value. Using the present embodiment, an arbitrary step size can be provided to the input signal 30. The fine variable capacitance block 50 comprises at least a first capacitor block 60 and a second capacitor block 70 connected in series.

Figure 3:
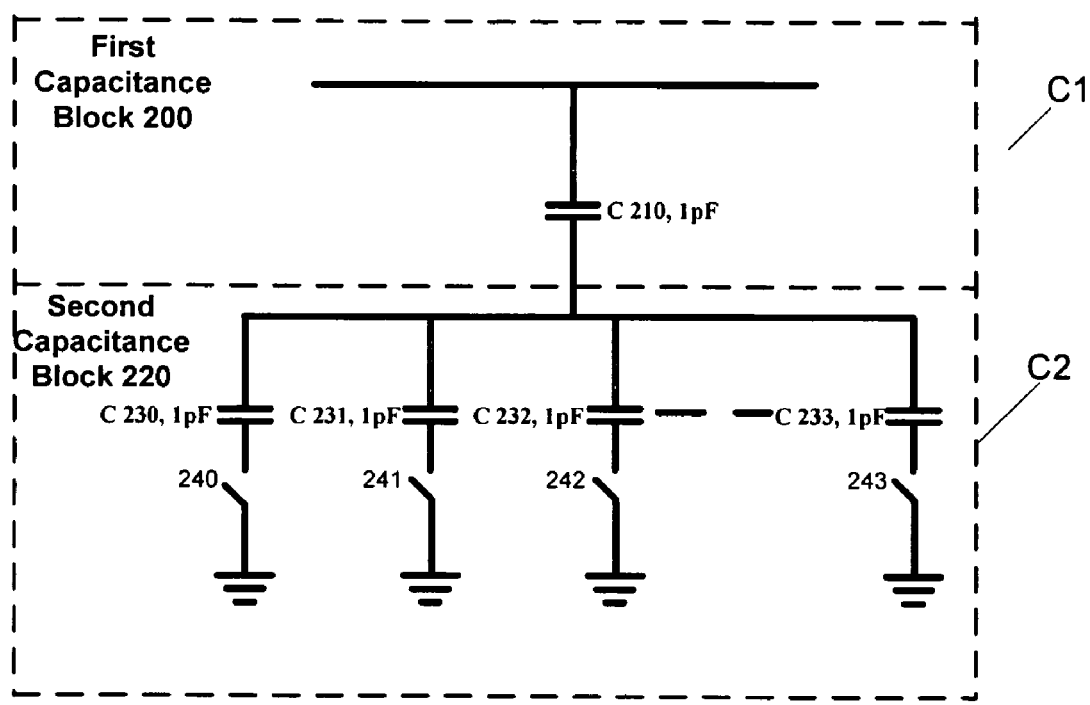
FIG. 3 is a block diagram of another example embodiment of a capacitor system.

FIG. 3 is a block diagram of another example embodiment of a capacitor system. A first capacitance block 200 is coupled in series with a second capacitance block 220. The first capacitance block may, for example, include a first capacitor 210 (providing a capacitance of C1) and a second capacitance block 220 (providing a capacitance of C2), which may include one or more additional (switchable) capacitors 230, 231, 232, and 233 controllable with switches 240, 241, 242, and 243. For purposes of the example, it is shown that all of the capacitors in the system are 1 pico-farad (pF) capacitors, but any size capacitors may be used and they need not be equivalent in capacitance.

By opening and closing the switches 240-243 in the second capacitance block 220, different capacitance values for C2

(second capacitance block 220) may be provided or selected. More specifically, a non-linear relationship exists between each step in the second capacitance block 220 and overall capacitance, wherein each step may comprise closing the switch on all of the closed capacitors in the previous step plus closing one or more additional capacitors within second capacitance block 220.

As the ratio of capacitance values of the second capacitance block 220 to the first capacitance block (which may be represented as C2/C1) increases, the step size decreases (e.g., approaches zero). In this manner, by selecting the relative size of the second capacitance block 220 as compared to the first capacitance block 200 (coupled in series), an arbitrarily small step size may be obtained. In FIG. 3, only four capacitors 230-233 are shown in block 220, but this branch can be increased towards an infinite number of additional capacitors connected in parallel. As the second capacitance block 220 has additional capacitors added in parallel in the branch, it becomes possible to create an arbitrarily small step in the switchable capacitor, which can be advantageous in environments that require a small step.

The capacitor system or apparatus represented in FIG. 3 has an effective capacitance as shown in Equation 1:

$$\text{Effective Capacitance} = 1/[(1/C1)+(1/C2)] \qquad \text{Equation 1:}$$

When switches 240-243 of second capacitance block 220 of FIG. 3 are all open, the system has no capacitance because C2 becomes 0, and as one can see in Equation 1, in such a scenario, the effective capacitance is also 0. This configuration represents a setting of 0 or "all off". Likewise, when one of the switches 240-243 is closed, C1 has a capacitance of, for example, 1 pF and C2 is 1 pF and from Equation 1, the effective capacitance of the capacitor system is 0.5. When two switches in C2 are closed the effective capacitance is 0.66. When three switches are closed the effective capacitance is 0.75. Table 2 shows the results from controlling all of the states of the example embodiment of FIG. 3 plus additional states (not shown):

TABLE 2

| Setting | C1 | C2 | Effective Capacitance |
|---------|----|----|----------------------|
| 0 | 0 | 0 | All Off |
| 1 | 1 | 1 | .5000 |
| 2 | 1 | 2 | .6666 |
| 3 | 1 | 3 | .7500 |
| 4 | 1 | 4 | .8000 |
| 5 | 1 | 5 | .8333 |

Therefore, in Table 2 the initial step between setting 0 ("all off" or 0) and a setting 1 (having only a first capacitor closed in the second capacitance block) is 0.5. The step between setting 1 and setting 2 (i.e., two capacitors operating in parallel in the second capacitance block) is the difference between 0.66 and 0.5, which is only 0.16. Likewise, the difference between setting 3 and setting 2 is 0.75-0.66, which is 0.09. Therefore, it can be seen that, according to an example embodiment, as the size (or capacitance) of C2 increases as compared to the size or capacitance of C1, the step size decreases, in a nonlinear fashion.

By opening and closing the associated switches in the second capacitance block 220 (C2), different effective capacitance values are provided to the system. More specifically, a non-linear relationship exists between each step in the first variable capacitance block 200 and overall capacitance, wherein each step comprises closing the switch on all of the closed capacitors in the previous step plus closing one or more additional capacitors. As the ratio of capacitance of capacitance block 220 to capacitance block 200 (C2/C1) increases (or approaches infinity), the step size decreases (or approaches zero).

Figure 4:
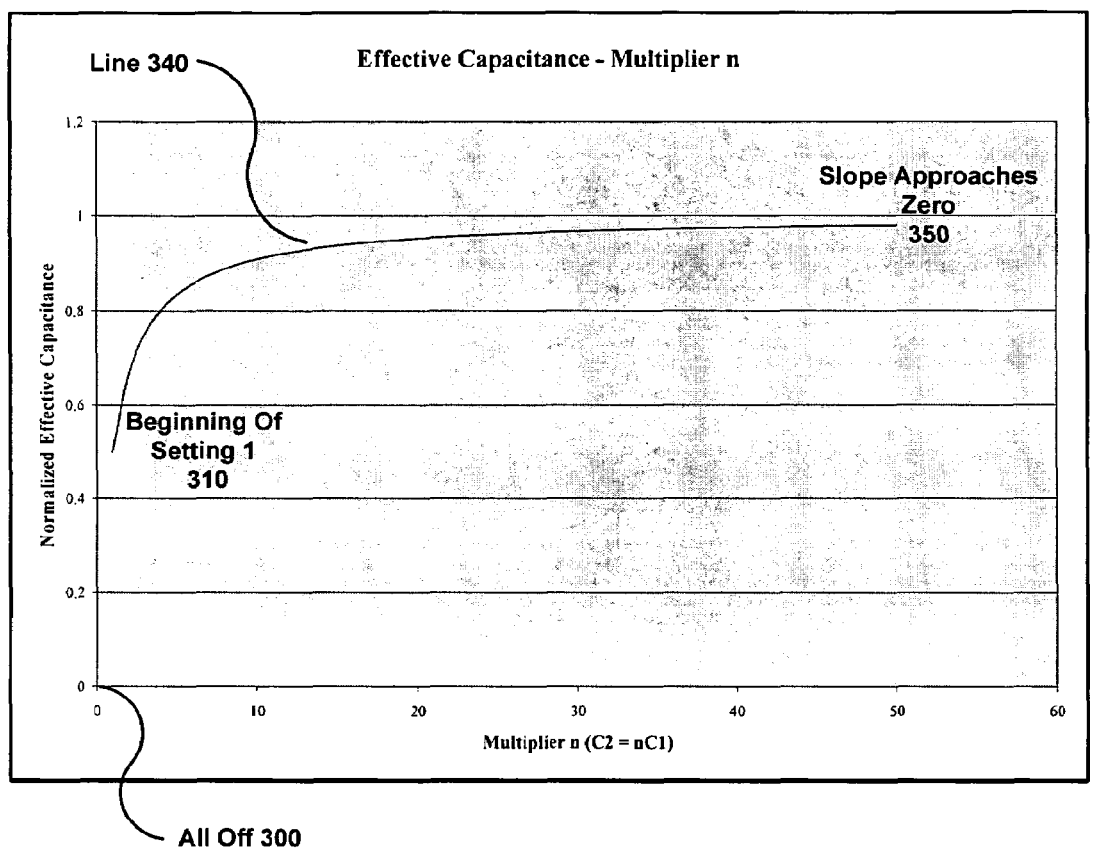
FIG. 4 is a graph showing the change in effective capacitance when an embodiment such as that shown in FIG. 3, is used.

FIG. 4 is a graph showing the change in effective capacitance when an embodiment of an architecture similar to FIG. 3 is used. On the y-axis of FIG. 4 the normalized effective capacitance is shown. On the x-axis of FIG. 4 a multiplier n having the property (C2=nC1) is shown. C1 is used to represent a first capacitance block and C2 is used to represent a second capacitance block, wherein the first and second capacitance blocks are connected in series. The multiplier n is used to show how many more capacitors block C2 has as compared to block C1 (i.e., the ratio of C2 to C1), according to an example embodiment. In this example, all of the capacitors in blocks C1 and C2 have identical properties, although it is not required. This is merely used to illustrate aspects of one or more embodiments. Therefore if n is 2, it means C1 has 1 capacitor activated and C2 has 2 capacitors activated (thus, the ratio C2/C1=2). Likewise, if n is 10, C1 has 1 capacitor activated and C2 has 10 capacitors activated (thus the ratio C2/C1=10).

For very large values of C2 as compared to C1, the variation of the effective capacitance compared to C2, has a very small slope (i.e., a very small change in the effective capacitance or step). If C2=(n*C1), then C-effective is [(n*C1)/(n+1)]. For low n values, changing the value of C2 from nC1 to [(n+1)*C1] will cause a large step. But, for large n values changing the value of C2 from (n*C1) to [(n+1)*C1] will cause a very small step in the C-effective value. The step size, according to an example embodiment, is shown in Equation 2:

$$\text{Step Size} = C1/[(n+1)*(n+2)] \qquad \text{Equation 2:}$$

Thus, operating in the region where n is large causes a very small change in effective capacitance. For example if C1=100 fF and C2 changes from 1900 fF to 2000 fF, C-effective will change from 95 fF to 95.24 fF (step size of 0.24 fF). Note that the values of C1 and C2 do not have to be very small in order to achieve the small step needed. Therefore, various embodiments can achieve a desired small step using capacitors that may be larger than the desired step.

Referring again to FIG. 4 and the settings of Table 2, an initial transition between setting 0 or "all off" 300 (FIG. 4) and setting 1 310 (FIG. 4) provides a step size of 0.5. This transition (from setting 0 to setting 1) is not shown by line 340 in FIG. 4 because the embodiment used to generate FIG. 4 does not have a switch on the leftmost or least significant capacitor in the second capacitance area. Thus, in an example embodiment, one capacitor in the second capacitance block 220 may not have a switch, so the initial step is not "all off", but having a single capacitor in both the first and second capacitance blocks closed.

Moving from the initial position (setting 1) 310 to setting 2 on the y-axis results in a change in effective capacitance of only 0.16. From the setting 2 (0.6666) to setting 3 (0.75) only raises the effective capacitance by a value of 0.09 on the y-axis. A line 340 is created on the graph having a slope 350 that decreases or approaches zero as n increases or approaches infinity (i.e., additional capacitors are added in parallel in the second capacitance area). Thus, after the initial 0.5 step (from setting 0 to setting 1, Table 2) in effective capacitance (if an "all off" configuration is used), the remaining step sizes decrease (e.g., in a non-linear fashion), and, for example, may never reach an effective capacitance of 1 on the y-axis. Hence, the capacitor system step may become arbitrarily small as the ratio C2/C1 increases, which is advantageous since the step size is no longer linear and does not depend on the size of the smallest capacitor that can be used in the architecture. This may allow a capacitor step size to be obtained or selected for a switchable capacitor system that may be much smaller than the smallest capacitor used in the system.

Table 3 illustrates example step sizes from 1 to 30 steps in order to illustrate the desired steps that one can obtain or design with a capacitor system according to an example embodiment. The number of branches in Table 3 refers to the number of capacitors or branches in the second capacitance block 220 (FIG. 3), since any number of capacitors or branches in the second capacitance block 220 may be used. The number of branches may indicate the number of capacitors switched on or coupled to ground within the second capacitance block 220, for example.

TABLE 3

| Number of Branches | Capacitance of Branch (Normalized) | Effective Capacitance | Difference Between Settings (step size) | Step Compared To Smallest Capacitor (%) |
|---|---|---|---|---|
| 1 | 1 | 0.5000 | 0.5000 | 50.00 |
| 2 | 1 | 0.6667 | 0.1667 | 16.67 |
| 3 | 1 | 0.7500 | 0.0833 | 8.33 |
| 4 | 1 | 0.8000 | 0.0500 | 5.00 |
| 5 | 1 | 0.8333 | 0.0333 | 3.33 |
| 6 | 1 | 0.8571 | 0.0238 | 2.38 |
| 7 | 1 | 0.8750 | 0.0179 | 1.79 |
| 8 | 1 | 0.8889 | 0.0139 | 1.39 |
| 9 | 1 | 0.9000 | 0.0111 | 1.11 |
| 10 | 1 | 0.9091 | 0.0091 | 0.91 |
| 11 | 1 | 0.9167 | 0.0076 | 0.76 |
| 12 | 1 | 0.9231 | 0.0064 | 0.64 |
| 13 | 1 | 0.9286 | 0.0055 | 0.55 |
| 14 | 1 | 0.9333 | 0.0048 | 0.48 |
| 15 | 1 | 0.9375 | 0.0042 | 0.42 |
| 16 | 1 | 0.9412 | 0.0037 | 0.37 |
| 17 | 1 | 0.9444 | 0.0033 | 0.33 |
| 18 | 1 | 0.9474 | 0.0029 | 0.29 |
| 19 | 1 | 0.9500 | 0.0026 | 0.26 |
| 20 | 1 | 0.9524 | 0.0024 | 0.24 |
| 21 | 1 | 0.9545 | 0.0022 | 0.22 |
| 22 | 1 | 0.9565 | 0.0020 | 0.20 |
| 23 | 1 | 0.9583 | 0.0018 | 0.18 |
| 24 | 1 | 0.9600 | 0.0017 | 0.17 |
| 25 | 1 | 0.9615 | 0.0015 | 0.15 |
| 26 | 1 | 0.9630 | 0.0014 | 0.14 |
| 27 | 1 | 0.9643 | 0.0013 | 0.13 |
| 28 | 1 | 0.9655 | 0.0012 | 0.12 |
| 29 | 1 | 0.9667 | 0.0011 | 0.11 |
| 30 | 1 | 0.9677 | 0.0011 | 0.11 |

As shown in Table 3, all of the capacitors used are given the value of 1 for simplicity, although any available capacitor can be used and the capacitors used need not all be of the same capacitance or value. Likewise the number of branches is shown from 1 through 30, although any number may be used. The effective capacitance step decreases between successive rows in the non-linear relationship described with respect to FIG. 4. The difference between settings describes the difference between the capacitance provided in the current step and the capacitance provided in the previous step.

The step size decreases non-linearly as the number of branches or capacitors (the capacitance value) for the second capacitance block 20 is increased (see FIG. 4). As one can see, by row 10 which represents the tenth step, the step size is less than 1% the size of the smallest capacitor in the system, which was previously not possible. Step ten represents, for instance, ten capacitors connected in parallel and turned on in a second capacitance block 220 (FIG. 3), and also connected in series to a first capacitance block 200 (e.g., FIG. 3). This is very similar to the capacitor system of FIG. 3, with the number of branches or capacitors within second capacitance block 220 being different, for example.

Figure 5:
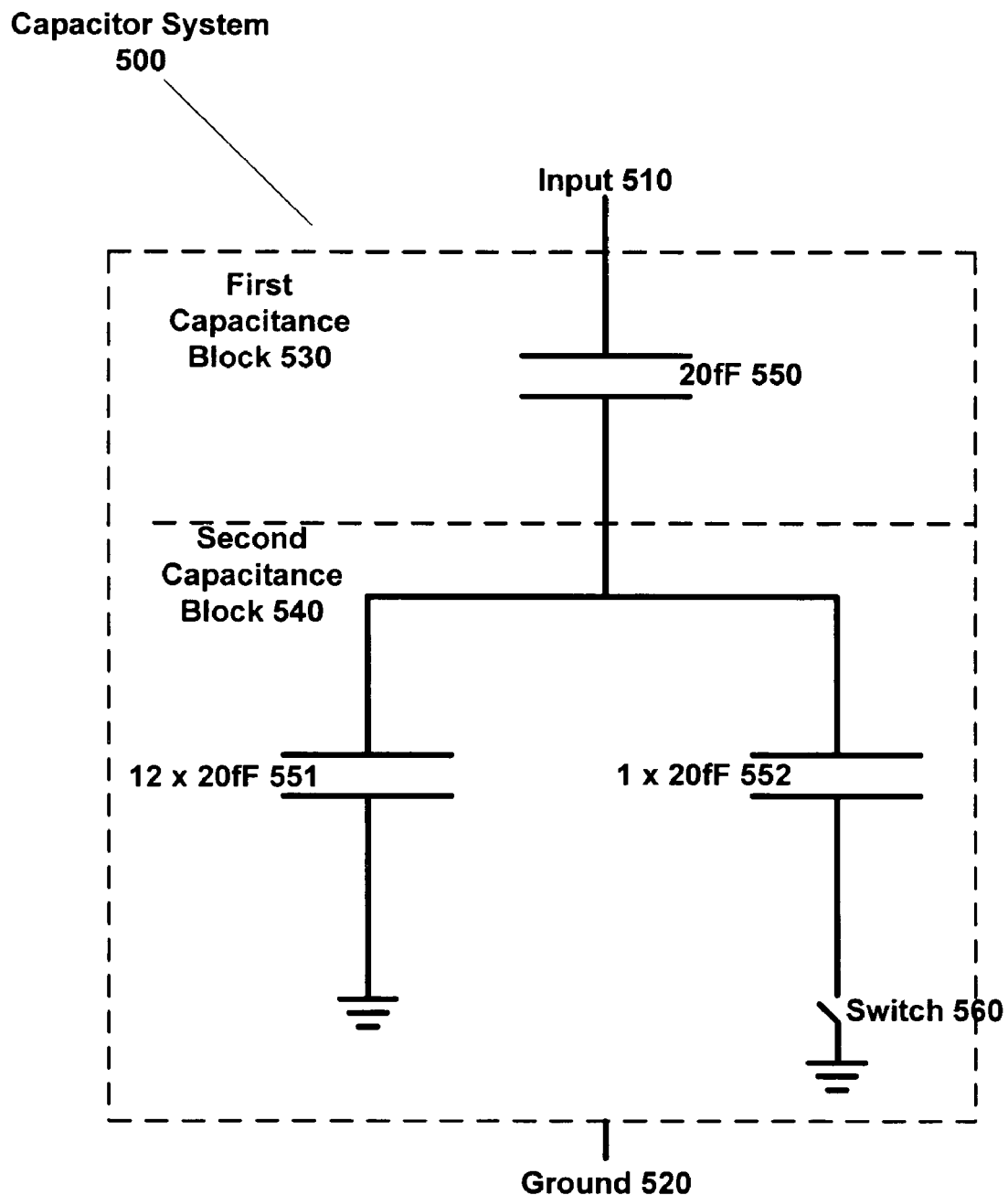
FIG. 5 is a diagram illustrating a small-step, switchable capacitor system (or capacitor) according to an example embodiment.

FIG. 5 is a diagram illustrating a small-step, switchable capacitor system (or capacitor) according to an example embodiment. The system includes a plurality of 20 fF capacitors, for example (or capacitors greater than 20 fF). The step or change in capacitance ($\Delta C$) between two states or settings may be, for example, approximately 1/200 the size of the 20 fF capacitor, or 0.109 fF.

In FIG. 5, the capacitor system 500 is provided between input 510 and ground 520. The apparatus includes a first capacitance block 530 and a second capacitance block 540 connected in series. A multiplier (N) is used to denote the number of parallel capacitors needed in second capacitance block 540 to create a certain effective capacitance (C-Effective) for the capacitor system 500. The values for this example embodiment are shown in Table 4:

TABLE 4

| First Cap. Block 530 | Second Cap. Block 540 | N | C-Effective | C-Difference ($\Delta C$) |
|---|---|---|---|---|
| 20 | 20 | 0 | 0 | 0 |
| 20 | 20 | 1 | 10 | 10 |
| 20 | 20 | 2 | 13.33333 | 3.333333 |
| 20 | 20 | 3 | 15 | 1.666667 |
| 20 | 20 | 4 | 16 | 1 |
| 20 | 20 | 5 | 16.66667 | 0.666667 |
| 20 | 20 | 6 | 17.14286 | 0.47619 |
| 20 | 20 | 7 | 17.5 | 0.357143 |
| 20 | 20 | 8 | 17.77778 | 0.277778 |
| 20 | 20 | 9 | 18 | 0.222222 |
| 20 | 20 | 10 | 18.18182 | 0.181818 |
| 20 | 20 | 11 | 18.33333 | 0.151515 |
| 20 | 20 | 12 | 18.46154 | 0.128205 |
| 20 | 20 | 13 | 18.57143 | 0.10989 |
| 20 | 20 | 14 | 18.66667 | 0.095238 |
| 20 | 20 | 15 | 18.75 | 0.083333 |
| 20 | 20 | 16 | 18.82353 | 0.073529 |
| 20 | 20 | 17 | 18.88889 | 0.065359 |
| 20 | 20 | 18 | 18.94737 | 0.05848 |

In the example shown in FIG. 5, the second capacitance block 540 includes 13-20 fF capacitors in parallel, as compared to the one 20 fF capacitor in the first capacitance block 530. This provides a multiplier or N=12 when switch 560 is open, and N=13 when switch 560 is closed. Thus, for this example, if the desired step size ($\Delta C$) is 0.10989, which is the step between the 12$^{th}$ and 13$^{th}$ row in Table 4, it indicates a small-step, switchable capacitor may be provided that includes a first capacitance block 530 having one 20 fF capacitor (550) and a second capacitance block 540 having the following properties: 12 20 fF capacitors 551 and another 20 fF capacitor 552, which includes a switch 560, coupled in parallel. By opening and closing switch 560, the step between rows 12 and 13 in Table 4 is produced, which is the required specification for this application, for example. Capacitor 551 may comprise twelve individual 20 fF capacitors connected in parallel or capacitor 551 may be a single capacitor having twelve times the strength of capacitor 552 (e.g., 240 fF).

Figure 6:
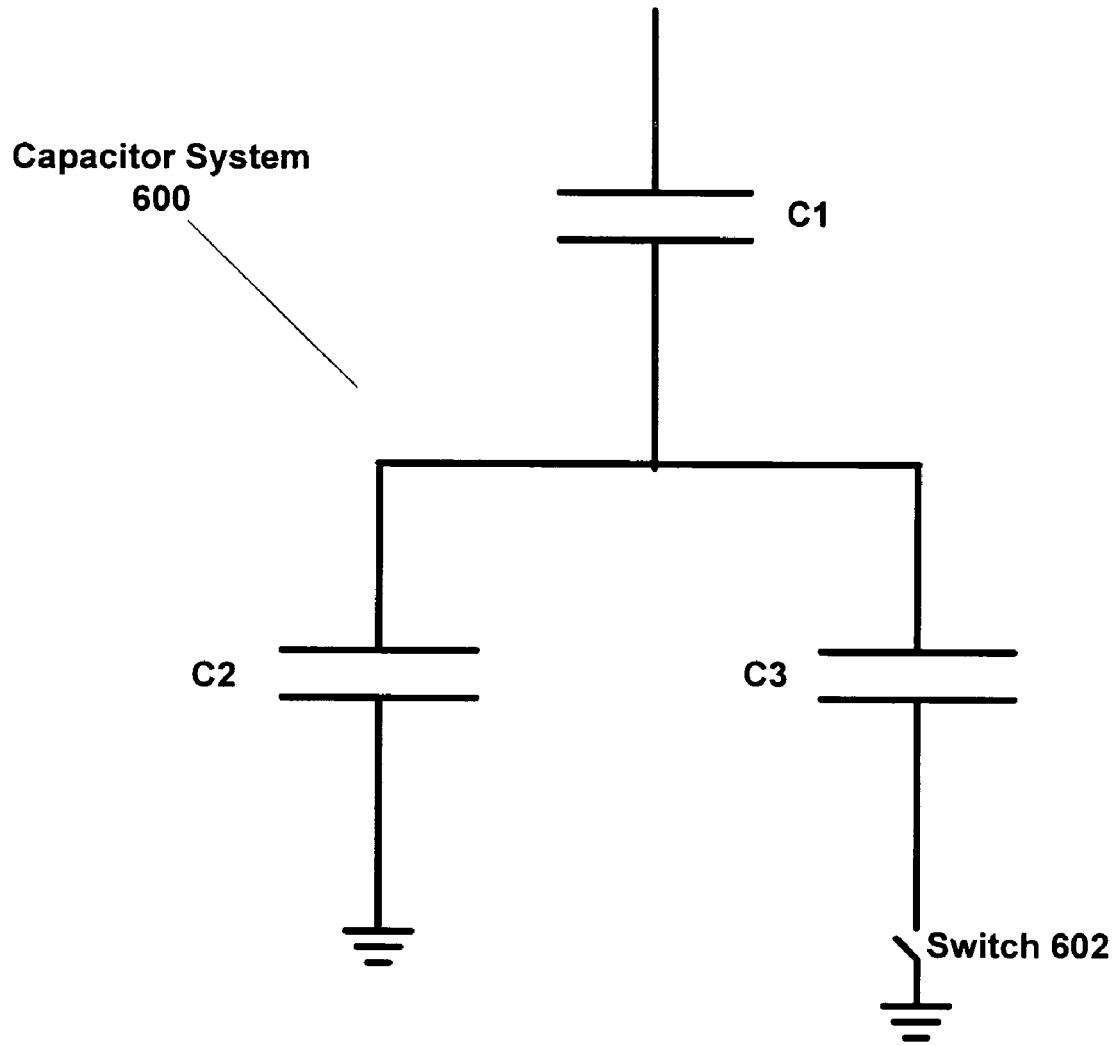
FIG. 6 is a block diagram of another example embodiment of a small-step, switchable capacitor system (or capacitor) 600.

FIG. 6 is a block diagram of another example embodiment of a small-step, switchable capacitor system (or capacitor) 600. Capacitor system 600 may include a capacitor C1 that is connected in series with capacitors C2 and C3. Capacitors C2 and C3 are connected in parallel. Capacitor C3 has a switch 602. When the switch 602 is open (or off), capacitor system 600 may provide an effective capacitance shown by Equation 2:

$$C\text{-Effective} = [(C1 * C2)/(C1 + C2)] \quad \text{Equation 2:}$$

When the switch 602 is closed (or on) capacitor system 600 provides an effective capacitance as shown by Equation 3:

$$C\text{-Effective}=[C1*(C2+C3)]/(C1+C2+C3) \quad \text{Equation 3:}$$

The difference between Equation 3 and Equation 2 results in the difference in the effective capacitance (ΔC), which may also be referred to as the capacitance step size (or difference in capacitance between the two settings or states). This example embodiment may be used, for example, when a designer requires a specific ΔC and C1, C2, and C3 are bigger than (or equal to) the minimum capacitance that is practical (e.g., 20 fF). For example if a ΔC, or step, of 0.18 is needed, steps 9-10 may be used as shown in Table 4. In such case, a 20 fF capacitor may be used for C1, 9 20 fF capacitors in parallel may be used for C2, and one 20 fF capacitor may be used for C3. Likewise, for a step (ΔC) of 0.4, steps 8-10 (2 steps) are needed, so C3 may use 2 20 fF capacitors connected by a common switch, while 8 20 fF capacitors may be used for C2, and C1 may be 1 20 fF capacitor, for example. These are merely some examples, and other numbers or values may be used.

Figure 7:
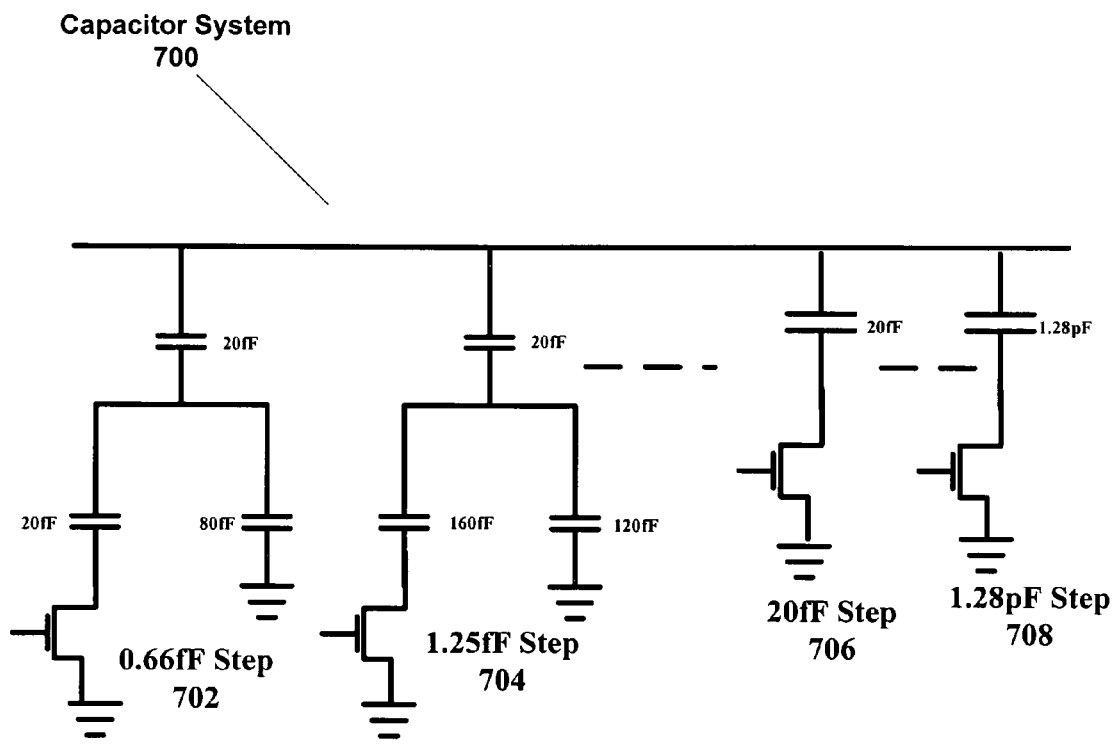
FIG. 7 is a diagram illustrating a capacitor system including a number of capacitor sub-systems according to an example embodiment.

The capacitor system 600 in FIG. 6 may be copied and used many times, as a capacitor sub-system, throughout a capacitor system to provide a variety of different step sizes, as needed. FIG. 7 is a diagram illustrating a capacitor system including a number of capacitor sub-systems according to an example embodiment. Capacitor system 700 may be a binary weighted system that includes a number of capacitor sub-systems (e.g., replicas of the capacitor system 600). Capacitor system 700 uses capacitors as small as 20 fF, but may provide a large effective capacitance range, with steps of 1 fF or less.

In FIG. 7, each of the capacitor sub-systems in capacitor system 700 includes a 20 fF capacitor as a first capacitance block. Each sub-system also includes a second capacitance block in series with the first capacitance block. Each second capacitance block may include at least one capacitor coupled to a switch. Some sub-systems that provide a step size smaller than 20 fF may typically include two (or more) capacitors in parallel to provide the small step size (smaller than the smallest capacitor in the capacitor system 700). For example, sub-system 702 may include a second capacitance block that includes a 20 fF capacitor coupled to a switch, in parallel with an 80 fF capacitor, to provide a step size of 0.66 fF. A sub-system 704 may provide a step size of 1.25 fF, and so forth. Until finally, a sub-system may be provided that provides a step size of 20 fF (which is the size of the smallest capacitor used in this example embodiment). Thus, beginning with sub-system 706 (providing a step size of 20 fF), the other sub-systems providing step sizes the same or greater than 20 fF can be provided using a single capacitor coupled to a switch, as shown in FIG. 7. Capacitor sub-system 708 may, for example provide a step size of 1.28 pf. Only some of the capacitor sub-systems of system 700 are shown in FIG. 7. There may be, a large number of these capacitor sub-systems within capacitor system 700.

Figure 8:
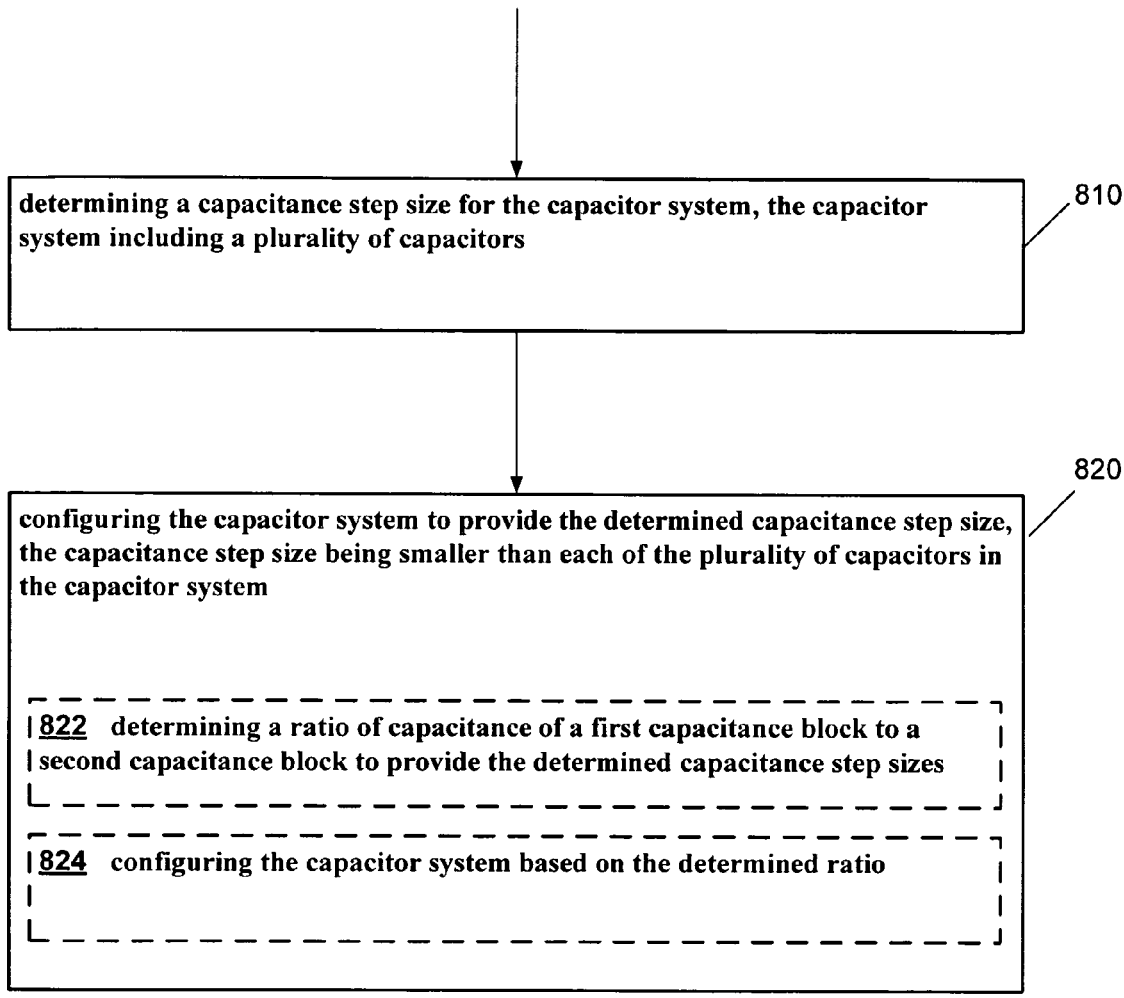
FIG. 8 is a flow chart illustrating a method of tuning or configuring a switchable capacitor system (or switchable capacitor) according to an example embodiment.

FIG. 8 is a flow chart illustrating a method of tuning or configuring a switchable capacitor system (or switchable capacitor) according to an example embodiment. At 810, a capacitance step size for the switchable capacitor system is determined. The capacitor system may include a plurality of capacitors. At 820, the capacitor system may be configured to provide the determined step size. The capacitance or value of the step size is smaller than each of the plurality of capacitors in the capacitor system.

In an example embodiment, block 820 may be provided as two sub-blocks (822 and 824). At 822, a ratio may be determined of a capacitance of a first capacitance block to the capacitance of a second capacitance block to provide the determined capacitance step size. At 824, the capacitor system may be configured based on the determined ratio. For example, certain size capacitors may be provided, or certain switches may be opened or closed to provide the determined ratio and/or the determined step size.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A capacitor system comprising:
    a first capacitance block including one or more capacitors; and
    a second capacitance block including one or more capacitors, the second capacitance block coupled in series with the first capacitance block, at least one of the first capacitance block and the second capacitance block including one or more switchable capacitors to provide a step in capacitance for the capacitor system between a first setting and a second setting using the one or more switchable capacitors,
    wherein the step in capacitance is configured to be smaller than each of the capacitors used in the first capacitance block and the second capacitance block.

2. The capacitor system of claim 1, wherein the first capacitance block comprises a single capacitor.

3. The capacitor system of claim 1, wherein the second capacitance block comprises:
    a first capacitor; and
    a second capacitor, controllable by an associated switch, connected in parallel to the first capacitor.

4. The capacitor system of claim 3, wherein the second capacitance block further comprises one or more additional capacitors, controllable by switches, connected in parallel to the first and second capacitors.

5. The capacitor system of claim 3, wherein the first capacitor is controllable by an associated switch.

6. A capacitor system comprising:
    a first capacitance block including one or more capacitors; and
    a second capacitance block coupled in series with the first capacitance block, the second capacitance block including one or more switchable capacitors,
    wherein the first and second capacitance blocks are configured to provide a step in capacitance of the capacitor system that is smaller than each of the capacitors used in the first capacitance block and the second capacitance block.

7. The capacitor system of claim 6, wherein the one or more switchable capacitors are configured to provide a step in capacitance for the capacitor system between a first setting and a second setting;
    wherein the step in capacitance of the capacitor system is determined based, at least in part, on a ratio of a capacitance of the second capacitance block to a capacitance of the first capacitance block.

8. The capacitor system of claim 7, wherein the step in capacitance is configured to be smaller than each of the capacitors used in the first capacitance block and the second capacitance block.

9. The capacitor system of claim 6, wherein the first capacitance block comprises a single capacitor.

10. The capacitor system of claim 6, wherein the second capacitance block comprises:
   a first capacitor; and
   a second capacitor, controllable by an associated switch, connected in parallel to the first capacitor.

11. The capacitor system of claim 6, wherein the second capacitance block comprises, a plurality of capacitors coupled in parallel, each-capacitor of the second capacitance block being controllable by a respective switch.

12. The capacitor system of claim 6, wherein the capacitor system provides a tuneable step in capacitance based on a ratio of a capacitance of the second capacitance block to a capacitance of the first capacitance block.

13. A method of tuning a switchable capacitor system to provide a desired step size, the method comprising:
   determining a capacitance step size for the capacitor system, the capacitor system including:
      a first capacitance block including one or more capacitors; and
      a second capacitance block including one or more capacitors, the second capacitance block coupled in series with the first capacitance block; and
   configuring the capacitor system to provide the determined capacitance step size, the capacitance step size being smaller than each of the capacitors in the first capacitance block and the second capacitance block.

14. The method of claim 13, wherein the configuring comprises:
   determining a capacitance ratio of the first capacitance block to the second capacitance block to provide the determined capacitance step size; and
   configuring the capacitor system based on the determined ratio.

15. The method of claim 14, wherein determining the capacitance ratio comprises:
   determining a capacitance ratio of the first capacitance block to the second capacitance block to provide the determined capacitance step size; and
   determining a size of a switchable capacitor to be used in at least one of the first capacitance block and the second capacitance block to provide the determined step size.

16. The method of claim 14, wherein the configuring comprises selectively opening and/or closing one or more switches associated with one or more switchable capacitors in the capacitor system based on the determined ratio.

* * * * *